United States Patent
Liu et al.

(10) Patent No.: US 7,737,045 B2
(45) Date of Patent: Jun. 15, 2010

(54) MICROFABRICATED MICRO FLUID CHANNELS

(75) Inventors: Chang Liu, Champaign, IL (US); Kee Ryu, Urbana, IL (US); David Bullen, Urbana, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 612 days.

(21) Appl. No.: 11/682,687

(22) Filed: Mar. 6, 2007

(65) Prior Publication Data

US 2007/0163647 A1    Jul. 19, 2007

Related U.S. Application Data

(62) Division of application No. 10/429,333, filed on May 5, 2003, now Pat. No. 7,217,396.

(51) Int. Cl.
    *H01L 21/302* (2006.01)
(52) U.S. Cl. ............... 438/738; 422/100; 438/422; 438/700; 438/706
(58) Field of Classification Search ........... 422/98–105; 438/282, 201, 704, 706, 800; 257/194
    See application file for complete search history.

(56) References Cited

U.S. PATENT DOCUMENTS

| 5,053,100 | A | 10/1991 | Hayes et al. |
| 5,221,415 | A | 6/1993 | Albrecht et al. |
| 5,514,501 | A | 5/1996 | Tarlov |
| 5,610,898 | A | 3/1997 | Takimoto et al. |
| 5,883,387 | A | 3/1999 | Matsuyama et al. |
| 5,922,214 | A | 7/1999 | Liu et al. |
| 5,923,637 | A | 7/1999 | Shimada et al. |
| 6,156,215 | A | 12/2000 | Shimada et al. |
| 6,284,113 | B1 | 9/2001 | Bjornson et al. |
| 6,291,140 | B1 | 9/2001 | Andreoli et al. |
| 6,353,219 | B1 | 3/2002 | Kley |
| 6,409,900 | B1 | 6/2002 | Parce et al. |
| 6,429,025 | B1 | 8/2002 | Parce et al. |
| 6,444,111 | B1 | 9/2002 | Montgomery |
| 6,555,389 | B1 | 4/2003 | Ullman et al. |
| 6,635,311 | B1 | 10/2003 | Mirkin et al. |

(Continued)

FOREIGN PATENT DOCUMENTS

EP    0786642 A1    7/1997

(Continued)

OTHER PUBLICATIONS

Horber, J.K.H. et al., "Scanning probe evolution in biology", Science, vol. 302, pp. 1002-1005, (2003).

(Continued)

*Primary Examiner*—Fernando L Toledo
*Assistant Examiner*—Mamadou Diallo
(74) *Attorney, Agent, or Firm*—Evan Law Group LLC (57) ABSTRACT

A fluid delivery system including a first substrate having a micro-channel and a well both formed through the first substrate. The fluid delivery system also includes a second substrate and a delivery channel. The second substrate is on the first substrate and the delivery channel is formed between the first and second substrates. The delivery channel provides fluid communication between the micro-channel and the well.

26 Claims, 4 Drawing Sheets

U.S. PATENT DOCUMENTS

| | | | |
|---|---|---|---|
| 6,642,129 | B2 | 11/2003 | Liu et al. |
| 6,827,979 | B2 | 12/2004 | Mirkin et al. |
| 6,867,443 | B2 | 3/2005 | Liu et al. |
| 6,943,417 | B2 | 9/2005 | Boland et al. |
| 7,034,854 | B2 | 4/2006 | Cruchon-Dupeyrat et al. |
| 7,042,828 | B2 | 5/2006 | Kley |
| 7,081,624 | B2 | 7/2006 | Liu et al. |
| 7,217,396 | B2 | 5/2007 | Liu et al. |
| 7,281,419 | B2 | 10/2007 | Wang et al. |
| 7,344,756 | B2 | 3/2008 | Mirkin et al. |
| 2001/0020588 | A1 | 9/2001 | Adourian et al. |
| 2001/0036674 | A1 | 11/2001 | Indermuhle et al. |
| 2002/0025279 | A1 | 2/2002 | Weigl et al. |
| 2002/0123153 | A1 | 9/2002 | Moon et al. |
| 2003/0017077 | A1 | 1/2003 | Hahn et al. |
| 2003/0026740 | A1 | 2/2003 | Staats |
| 2003/0049381 | A1 | 3/2003 | Mirkin et al. |
| 2003/0082080 | A1 | 5/2003 | Zimmermann et al. |
| 2004/0007053 | A1 | 1/2004 | Lutter et al. |
| 2004/0018116 | A1 | 1/2004 | Desmond et al. |
| 2004/0175631 | A1 | 9/2004 | Crocker et al. |
| 2004/0223886 | A1 | 11/2004 | Liu et al. |
| 2004/0226464 | A1 | 11/2004 | Mirkin et al. |
| 2004/0228962 | A1 | 11/2004 | Liu et al. |
| 2005/0201257 | A1 | 9/2005 | Champion et al. |
| 2005/0236566 | A1 | 10/2005 | Liu |
| 2007/0062264 | A1 | 3/2007 | Wang et al. |
| 2007/0163647 | A1 | 7/2007 | Liu et al. |
| 2007/0289369 | A1 | 12/2007 | Wang et al. |

FOREIGN PATENT DOCUMENTS

| | | |
|---|---|---|
| EP | 1 359 388 | 11/2003 |
| EP | 1388369 A2 | 2/2004 |
| WO | WO 99/56176 | 11/1999 |
| WO | WO 00/41213 | 7/2000 |
| WO | WO 01/91855 A1 | 12/2001 |
| WO | WO 2004/103886 A2 | 12/2004 |
| WO | WO 2004/105046 A2 | 12/2004 |
| WO | WO 2005/114673 A1 | 12/2005 |
| WO | WO 2007/037998 A1 | 4/2007 |

OTHER PUBLICATIONS

Smith, J.R. et al, "An overview to scanning probe microscopy", adapted from Educ. Chem, vol. 34, No. 4, pp. 107-111, (1997).

Kim et al., "A novel AFM Chip for fountain pen nanolithography—design and microfabrication," Mat. Res. Soc. Symp. Proc., vol. 782, pp. A5.56.1-A5.56.6, 2004.

Xu et al., "Microfabricated quill-type surface patterning tools for the creation of biological micro/nano arrays," Biomedical Microdevices 6:2, pp. 117-123, 2004.

Deladi et al., "Micromachined fountain pen for atomic force microscope-based nanopatterning," Applied Physics Letters, vol. 85, No. 22, pp. 5361-5363, 2004.

Lewis et al., "Fountain pen nanochemistry: atomic force control of chrome etching," Applied Physics Letters, vol. 75, No. 17, pp. 2689-2691, 1999.

Baldock et al., "Microfabricated Devices for Chemical and Biochemical Analysis Systems," located at http://www.in.umist.ac.uk/, presented at Microsystems 2010, Daresbury, Cheshire, 1 page, 2000.

Belaubre et al., "Fabrication of Biological Microarrays Using Microcantilevers", Applied Physics Letters, vol. 82, pp. 3122-3124, 2003.

Branch et al., "Microstamp Patterns of Biomolecules for High Resolution Neuronal Networks," Medical and Biological Engineering and Computing, vol. 36. pp. 135-141, 1998.

Brittain et al., "Soft Lithography and Microfabrication," Physics World, 11, pp. 31-36, 1998.

Bullen et al., "Micromachined Arrayed Dip Pen Nanolithography (DPN) Probes for Sub-100 nm Direct Chemistry Patterning", presented at 16th International Conference on Micro Electro Mechanical Systems (MEMS), Kyoto, Japan, pp. 4-7, 2003.

Bullen et al., "Thermo-Mechanical Optimization of Thermally Actuated Cantilever Arrays,", Proc. SPIE vol. 4700, Smart Structures and Materials 2002: Smart Electronics, MEMS, and Nanotechnology, pp. 288-295; Jul. 2002.

Chow et al., "Characterization of a Two-Dimensional Cantilever Array with Through-Wafer Electrical Interconnects", Applied Physics Letters, vol. 80, pp. 664-666, 2002.

Cooper et al., "Terabit-Per-Square-Inch Data Storage With the Atomic Force Microscope", Applied Physics Letters, vol. 75, pp. 3566-3568, 1999.

Bullen et al., "Design, Fabrication, and Characterization of Thermally Actuated Probe Arrays for Dip Pen Nanolithography," J. Microelectromechanical Systems, vol. 13, No. 4, pp. 594-602, Aug. 2004.

Hertel et al., "Manipulation of Individual Carbon Nanotubes and Their Interaction with Surfaces", Journal of Physical Chemistry B, vol. 102, pp. 910-915, 1998.

Higa et al., "Fabrication of Microcantilever with a Silicon Tip Prepared by Anodization", Japanese Journal of Applied Physics, vol. 37, Part 1, No. 12B, pp. 7078-7080, 1998.

Hong et al., "A nanoplotter with both parallel and serial writing capabilities," Science, vol. 288, pp. 1808-1811, 2000.

International Search Report and Written Opinion for PCT Application No. PCT/US04/13974, 9 pages, dated Nov. 30, 2005.

International Search Report for PCT Application No. PCT/US2004/015161,7 pages, dated Feb. 10, 2005.

Jo et al., "Three-Dimensional Micro-Channel Fabrication in Polydimethylsiloxane (PDMS) Elastomer," J. Microelectrochemical Systems, vol. 9, pp. 76-81, 2000.

Ryu et al., "Precision Patterning of PDMS Thin Films: A New Fabrication Method and Its Applications," Sixth International Symposium on Micro Total Analysis System (mTAS), Nara, Japan, 3 pages, Nov. 2002.

Wang et al., "Multifunctional probe array for nano patterning and imaging," Nano Letters, vol. 5, No. 10, pp. 1867-1872, 2005.

Khoo et al., "Micro Magnetic Silicone Elastomer Membrane Actuator," Sensors and Actuators. A, 89, pp. 259-266, 2001.

Sawchyn, "Integrated Circuits", Kirk-Othmer Encyclopedia of Chemical Technology, vol. 14, pp. 677-709, 1995.

Kumar et al., "Patterning Self-Assembled Monolayers: Applications in Materials Science", Langmuir, 10, pp. 1498-1511, 1994.

Libioulle et al., "Contact-Inking Stamps for Microcontact Printing of Alkanethiols on Gold," Langmuir, vol. 15, pp. 300-304, 1999.

Liu et al., "Mass-Producible Monolithic Silicon Probes for Scanning Probe Microscopes", Sensors and Actuators A, vol. 71, pp. 233-237, 1998.

Lopez et al., "Fabrication and Imaging of Two-Dimensional Patterns of Proteins Adsorbed on Self-Assembled Monolayers by Scanning Electron Microscopy," Journal of American Chemical Society, vol. 115, pp. 10774-10781, 1993.

Lutwyche et al., "5×5 2D AFM Cantilever Arrays A First Step Towards A Terabit Storage Device", Sensors and Actuators A, vol. 73, pp. 89-94, 1999.

Marzolin et al., "Patterning of a Polysiloxane Precursor to Silicate Glasses By Microcontact Printing," Thin Solid Films, vol. 315, pp. 9-12, 1998.

Minne et al., "Centimeter Scale Atomic Force Microscope Imaging and Lithography", Applied Physics Letters, vol., 73, No. 12, pp. 1742-1744, 1998.

Minne et al., "Parallel Atomic Force Microscopy Using Cantilevers with Integrated Piezoresistive Sensors and Integrated Piezoelectric Actuators", Applied Physics Letters, vol. 67 (26), pp. 3918-3920, 1995.

Niklaus, "Void-Free Full Wafer Adhesive Bonding", presented at MEMS'00, Miyazaci, Japan, pp. 323-328, Jan. 23-27, 2000.

International Search Report and Written Opinion for PCT Application No. PCT/US20006/035826, 13 pages, dated Dec. 19, 2006.

Petersen, "Silicon As A Mechanical Material", Proceedings of the IEEE, vol. 70, No. 5, pp. 420-457, 1982.

Pierret, Semiconductor Device Fundamentals, Table 1.1, Addison-Wesley, p. 4 (3 pages total), 1995.

Piner et al., "'Dip-Pen' Nanolithography", Science, vol. 283, pp. 661-663, 1999.

Snow et al., "Nanofabrication with Proximal Probes", Proceedings of the IEEE, vol. 85, No. 4, pp. 601-611, 1997.

Van Zant, "Microchip Fabrication: A Practical Guide to Semiconductor Processing," Chapter 16 Semiconductor Devices and Integrated Circuit Formation, pp, 491-529, 2000.

Vettiger et al., "Ultrahigh density, high-data-rate NEMS-based AFM data storage system", Microelectronic Engineering, vol. 46, pp. 11-17, 1999.

Wang et al., "Scanning Probe Contact Printing", Langmuir, vol. 19, pp. 8951-8955, 2003.

Wang et al., "Scanning Probe with Elastomeric (PDMS) Tip for Scanning Probe Microcontact Printing (SP-CP)", presented at the $12^{th}$ International Conference on Solid-State Sensors, Actuators and Microsystems, Boston, MA, 1003-1006, 2003.

Wilson et al., "Surface Organization and Nanopatterning of Collagen by Dip-Pen Nanolithography", PNAS, vol. 98, No. 24, pp. 13660-13664, 2001.

Wang et al., "Scanning probe lithography tips with spring-on tip designs: Analysis, fabrication, and testing", Applied Physics Letters, 87, 054102-1 to 054102-3, 2005.

Wu et al., "Origin of Nanomechanical Cantilever Motion Generated from Biomolecular Interactions", PNAS, vol. 98, No. 4, pp. 1560-1564, 2001.

Xia et al., "Soft Lithography," Annual Review of Material Science, vol. 28, pp. 153-184, 1998.

Zhang et al., "A MEMS Nanoplotter with High-Density Parallel Dip-Pen Nanolithography Probe Arrays", Nanotechnology, vol. 13, pp. 212-217, 2002.

Zou et al., "A mould-and-transfer technology for fabricating scanning probe microscopy probes," Journal of Micromechanics and Microengineering, vol. 14, pp. 204-211, 2004.

Wang et al., "Thermally actuated probe array for parallel dip-pen nanolithography," J. Vac. Sci. Technol. B., 22(6), pp. 2563-2567, 2004.

Zhang et al., "Passive and Active Probe Arrays for Dip-Pen Nanolithography," First IEEE Conference on Nanotechnology, Maui, HI, 5 pages, 2001.

Hong et al., "Multiple Ink Nanolithography: Toward a Multiple-Pen Nano-Plotter", Science, vol. 286, pp. 523-525, 1999.

MICROFABRICATED MICRO FLUID CHANNELS

REFERENCE TO RELATED APPLICATIONS

This application is a Divisional application of U.S. patent application Ser. No. 10/429,333 entitled "Microfabricated Micro Fluid Channels" filed May 5, 2003, now U.S. Pat. No. 7,217,396 which is incorporated by reference in its entirety.

FEDERALLY SPONSORED RESEARCH OR DEVELOPMENT

This invention was made with Government support under Contract Number DAAD19-00-1-0414 awarded by the Army Research Office (ARO), and Contract Number F49620-01-1-0401 awarded by the Air Force Office of Scientific Research (AFOSR). The Government may have certain rights in the invention.

BACKGROUND

This invention relates generally to array chemical transfer devices, and in particular, to a fluid delivery system having an array of micro-channels in fluid connection with an array of wells.

In nanolithography, such as dip pen lithography (DPN) or other types of arrayed chemical transfer methods, it is desirable to provide inks, chemical or biological fluids, to a plurality of probes simultaneously. An arrayed fluid dispensing system with matching spatial configuration to the probe array would allow efficient inking of such an array of probes. Neighboring probes with very small distances between them can receive distinct inks. The probes can then be used to create high density arrays of biochemical substances, such as DNA or protein arrays.

BRIEF SUMMARY

According to one aspect of the present invention, a method for fabricating a fluid delivery system is provided. The method includes attaching a first substrate and a second substrate to form a delivery channel between the first substrate and the second substrate. The delivery channel provides fluid communication between a first micro-channel and a first well. The first micro-channel and the first well are both in the first substrate.

According to another aspect of the present invention, a fluid delivery system is provided. The fluid delivery system includes a first substrate having a micro-channel and a well both formed through the first substrate. The fluid delivery system also includes a second substrate and a delivery channel. The second substrate is on the first substrate, and the delivery channel is formed between the first and second substrates. The delivery channel provides fluid communication between the micro-channel and the well.

According to another aspect of the present invention, a method for forming a micro-pipette is provided. The method includes etching a top surface of a substrate to remove a portion of the substrate. The substrate has a micro-channel formed through the first substrate, where the top surface is opposed to a bottom surface. The top surface, the bottom surface, and the micro-channel are coated with a support material.

According to another aspect of the present invention, an apparatus for transferring fluid is provided. The apparatus includes a substrate having a top surface opposed to a bottom surface and a layer of support material. The substrate and the layer of support material form a micro-channel. The micro-channel opens at the bottom surface of the substrate and extends above the top surface of the substrate.

It should be appreciated that for simplicity and clarity of illustration, elements shown in the Figures have not necessarily been drawn to scale. For example, the dimensions of some of the elements are exaggerated relative to each other for clarity. Further, where considered appropriate, reference numerals have been repeated among the Figures to indicate corresponding elements.

DETAILED DESCRIPTION

The present invention includes micro fluid channels. The micro fluid channels are formed by etching partially or completely through a substrate. The micro fluid channels may protrude from the substrate to form micro-pipettes, which may be in the form of an array. The channels may be part of a fluid delivery system, including one or more additional substrates, with channels between the substrates connecting the micro fluid channel to wells having a larger size, allowing for various fluids to easily be delivered to the micro fluid channel. These micro fluid channels may then be used to ink a probe or array of probes, to spot surfaces. This will allow for patterning, with the various fluids, to form, for example high density arrays of biochemical substances.

A "micro fluid channel" or "micro-channel" means a channel having a cross-sectional area of at most 10,000 square microns, more preferably at most 2500 square microns, most preferably at most 100 square microns.

Figure 1:
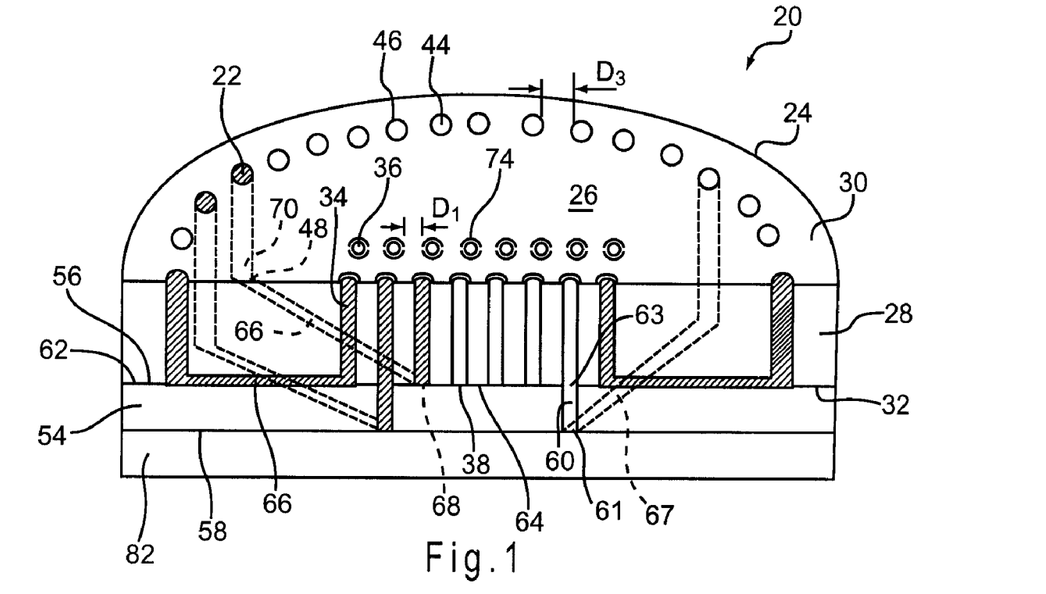
FIG. 1 illustrates a cross-sectional view of a fluid delivery system containing multiple substrates, in accordance with one preferred embodiment of the invention.

Shown in FIG. 1, in cross-section, is a fluid delivery system 20 which includes a first substrate 28 overlying a second substrate 54. Preferably, the first and second substrate 28, 54 comprise a single crystal silicon substrate; however, first and second substrate 28, 54 may comprise other materials. Preferably, the substrates 28, 54 each have a thickness of 1000 to 200 microns, such as 300 to 500 microns. Preferably, the first and second substrates 28, 54 have top surfaces 30, 56 which are previously processed and cleaned to remove debris and native oxides.

Figure 2:
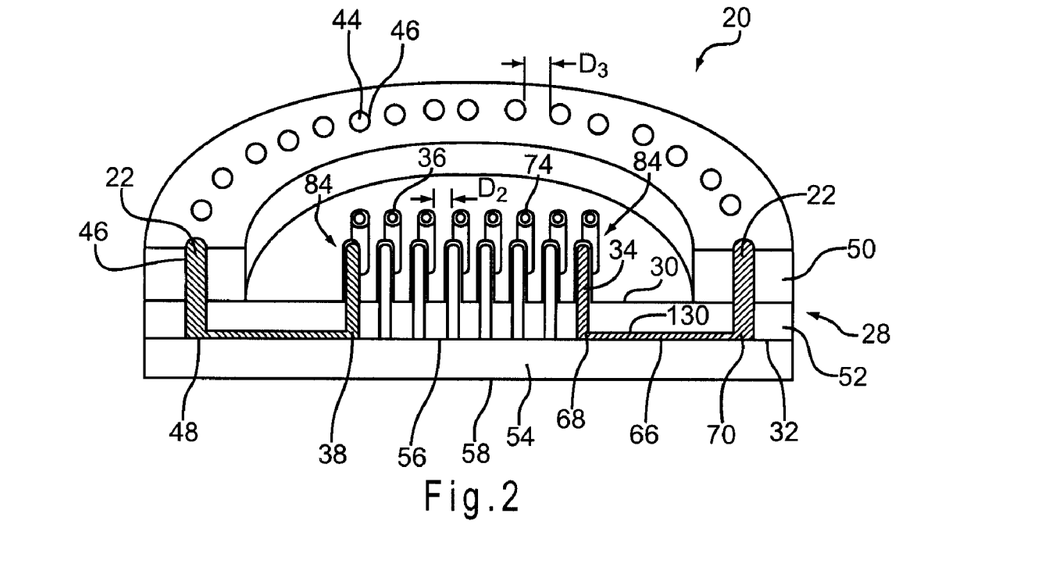
FIG. 2 illustrates a cross-sectional view of a fluid delivery system containing multiple substrates, in accordance with one preferred embodiment of the invention.
Figure 4:
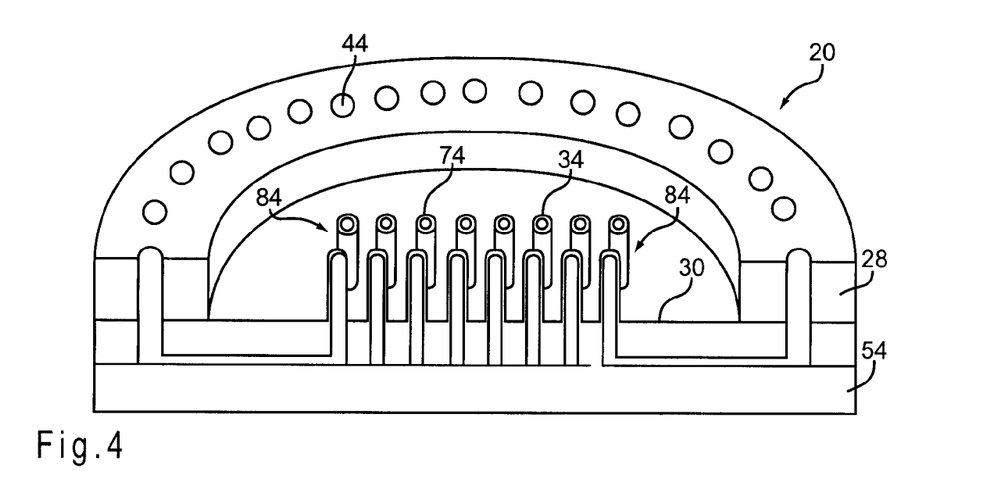
FIG. 4. illustrates a cross-sectional view of a fluid delivery system containing multiple substrates, in accordance with one preferred embodiment of the invention.
Figure 5:
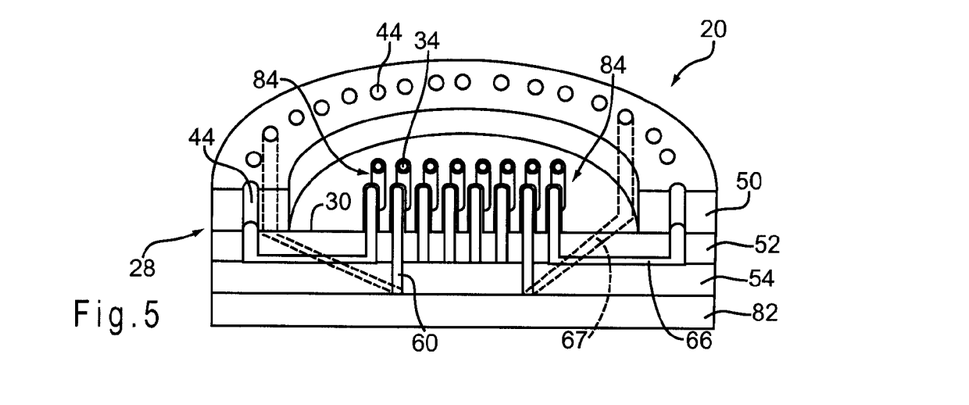
FIG. 5. illustrates a cross-sectional view of a fluid delivery system containing multiple substrates, in accordance with one preferred embodiment of the invention.

First substrate 28 has a top surface 30 opposed to a bottom surface 32. First substrate 28 also has an outer edge 24 surrounding an inside surface 26, as illustrated in FIG. 1. In one embodiment, the first substrate 28 is formed from a single substrate, as illustrated in FIGS. 1 and 4, while in another embodiment, the first substrate 28 is formed from multiple substrates, such as an upper substrate 50 and a lower substrate 52, and then bonded together, as illustrated in FIGS. 2 and 5.

Upper and lower substrates 50, 52 may be bonded in one of many ways, such as spin on bonding using photoresist or an adhesive polymer for adhesive bonding, which may be patterned (see for example "VOID-FREE FULL WAFER ADHESIVE BONDING" F. Niklaus, et al.); or high-temperature bonding, for example by heating the substrates together at about 1100° C. Alignment may be achieved using an alignment mark, or using features present on the substrates.

Figure 7:
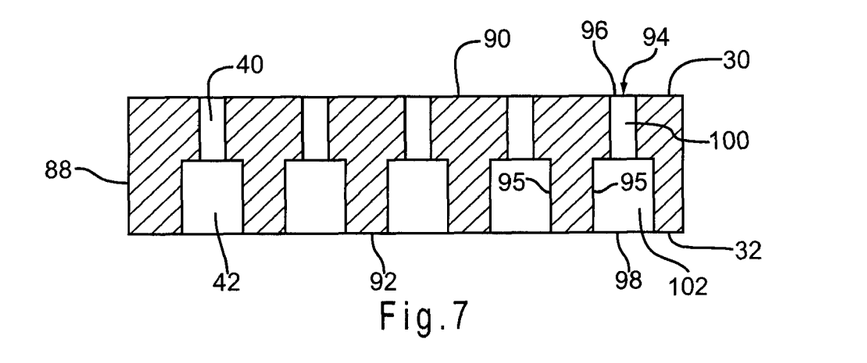

A micro-channel 34 is formed through the first substrate 28 from the top surface 30 to the bottom surface 32. Preferably, the micro-channel 34 is formed by etching all the way through the first substrate 28 from the top surface 30 to the bottom surface 32; however other means for forming the micro-channel 34 may be used, such as drilling. Preferably, the micro-channel 34 is formed using anisotropic etching. In one embodiment, the micro-channel 34 is formed by etching through the top surface 30 to form a first channel 40 and then etching through the bottom surface 32 to form a second channel 42, wherein the first and second channels 40, 42 are in fluid communication, as illustrated in FIG. 7. Preferably, the cross-sectional area of the first channel 40 is less than the cross-sectional area of the second channel 42. More preferably, the ratio of the cross-sectional area of the first channel 40 to the cross-sectional area of the second channel 42 is between 1 to 1 and 1 to 10.

Figure 3:
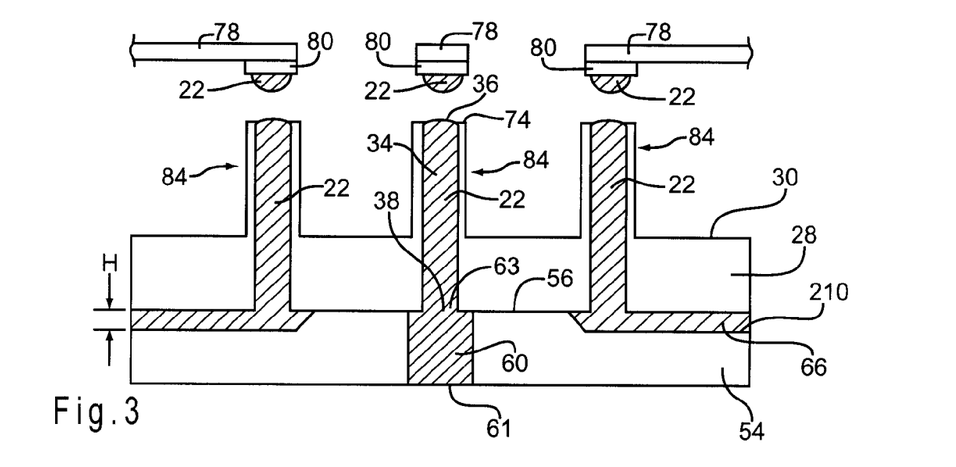
FIG. 3. illustrates an enlarged cross-sectional view of a portion of a fluid delivery system containing multiple substrates, in accordance with one preferred embodiment of the invention.

The micro-channel 34 has an inlet 38 for receiving fluid 22 from a delivery channel 66 and an outlet 36 for delivering fluid 22, preferably, to a probe 78, as illustrated in FIG. 3. In one embodiment, the outlet 36 has a cross-sectional area that is generally circular in shape. Preferably, the outlet 36 has a cross sectional area that is at most 10,000 square microns, more preferably at most 2,500 square microns, and most preferably at most 100 square microns. In one embodiment, the outlet 36 has a cross sectional area that is between ten and 10,000 square microns. Preferably, the inlet 38 has a cross-sectional area that is larger than the cross-sectional area of the outlet 36. The cross-sectional areas and shapes of the inlet 38 and the outlet 36 may be freely chosen, using patterning techniques, such as those used to pattern semiconductor substrates.

Preferably, the first substrate 28 includes a hydrophobic surface 74 surrounding the outlet 36, as illustrated in FIG. 1. The hydrophobic surface 74 prevents fluid 22 from overflowing and unintentionally exiting the outlet 36, and possibly causing cross-contamination between fluids 22. The hydrophobic surface 74 can be formed in one of many ways, such as coating the outlet 36 of the micro-channel 34 with a hydrophobic material, for example a silane or thiol, such as 1-octadecanethiol (ODT), or a photoresist. Preferably, an array of micro-channels 34 is formed through the first substrate 28 from the top surface 30 to the bottom surface 32, as illustrated in FIG. 1. The distance $D_1$ between adjacent micro-channels 34 is preferably at most 1000 microns, more preferably at most 600 microns, most preferably at most 200 microns.

A well 44 is formed through the first substrate 28 from the top surface 30 to the bottom surface 32. Preferably, the well 44 is formed by etching all the way through the first substrate 28 from the top surface 30 to the bottom surface 32; however, other means for forming the well 44 may be used, such as drilling. Preferably, the well 44 is formed using reactive ion etching. The well 44 has an inlet 46 for receiving fluid 22 from a fluid delivery device, such as a conventional pipette or pump. The well 44 also includes a well outlet 48 for delivering fluid 22 to the delivery channel 66, as illustrated in FIG. 1. In one embodiment, the well inlet 46 has a cross-sectional area that is generally circular in shape. Preferably, the well inlet 46 has a cross-sectional area that is greater than the cross-sectional area of the micro-channel outlet 36. Forming the well inlet 46 with a cross-sectional area that is larger than the cross-sectional area of the micro-channel outlet 36 allows for fluids 22 to be easily injected into the well inlet 46, and yet still be deliverable, through the smaller micro-channel outlet 36, to a probe 78. Preferably, the well inlet 46 has a cross sectional area that is between 1 and 20 square millimeters, more preferably between 3 and 12 square millimeters, and most preferably between 5 and 10 square millimeters. In one embodiment, the distance $D_3$ between adjacent wells 44 is greater than the distance $D_1$ between adjacent micro-channels 34 or the distance $D_2$ between adjacent micro-pipettes 84, as illustrated in FIGS. 1 and 2.

Preferably, an array of wells 44 is formed through the first substrate 28 from the top surface 30 to the bottom surface 32, as illustrated in FIG. 1. Preferably, the array of wells 44 is formed near the outer edge 24 of the first substrate 28, while the array of micro-channels 34 is formed at the inside surface 26 of the first substrate 28, as illustrated in FIG. 1.

Second substrate 54 has a top surface 56 opposed to a bottom surface 58. Second substrate 54 also has an outer edge 62 surrounding an inside surface 64, as illustrated in FIG. 1. Second substrate 54 is positioned so that the top surface 56 is on the bottom surface 32 of the first substrate 28. In one embodiment, an extended channel 60 is formed through the second substrate 54 from the top surface 56 to the bottom surface 58. Preferably, the extended channel 60 is formed by etching all the way through the second substrate 54 from the top surface 56 to the bottom surface 58; however, other means for forming the extended channel 60 may be used, such as drilling. Preferably, the extended channel 60 is formed using reactive ion etching. The extended channel 60 has an inlet 61 for receiving fluid 22 from a secondary delivery channel 67 and an outlet 63 for delivering fluid 22 to the inlet 38 of the micro-channel 34, as illustrated in FIGS. 1 and 3. The secondary delivery channel 67 is formed between the second substrate 54 and a third substrate 82, as illustrated in FIG. 1. In one embodiment, the outlet 63 has a cross-sectional area that is generally circular in shape.

The delivery channel 66 is formed between the first and second substrates 28, 54, as illustrated in FIGS. 1 and 2. Preferably, the height H of the delivery channel, as illustrated in FIG. 3, is between one and twenty microns, and more preferably, at most ten microns. The delivery channel 66 may be formed in one of many ways. In one embodiment, the delivery channel 66 includes a groove 210 that is formed on the top surface 56 of the second substrate 54. In one embodiment, the delivery channel 66 includes a groove 130 that is formed on the bottom surface 32 of the first substrate 28. In one embodiment, the delivery channel 66 includes a first groove that is formed on the top surface 56 of the second substrate 54 and a second groove that is formed on the bottom surface 32 of the first substrate 28. The first substrate 28 is aligned with the second substrate 54 so that the delivery channel 66 allows for fluid to travel between the micro-channel 34 and the well 44. The delivery channel 66 includes an inlet 70 for receiving fluid and an outlet 68 for delivering fluid 22. The delivery channel inlet 70 receives fluid 22 from the well outlet 48 of the well 44, while the delivery channel outlet 68 delivers fluid 22 to the inlet 38 of the micro-channel 34.

The delivery channel inlet 70 is adjacent to the well outlet 48, and the delivery channel outlet 68 is adjacent to the inlet 38, as illustrated in FIG. 1.

In one embodiment, the micro-channel 34 extends both above and below the top surface 30 of the first substrate 28, as illustrated in FIGS. 2-5. In this embodiment, the micro-channel 34 may be formed entirely from the first substrate 28, a portion of the micro-channel 34 may be formed from the first substrate 28, or the micro-channel 34 may be formed from a second material. The second material may be any material that can be formed or coated onto a surface, such as those used in semiconductor processing. Examples include oxides, such as silicon oxide and silicon oxynitride, nitrides such as silicon nitride and titanium nitride, metals such as tungsten and gold, and polymers. Preferably, the micro-channel 34 is formed from the second material, wherein the second material extends both above and below the top surface 30 of the first substrate 28.

In one embodiment, a method for fabricating the fluid delivery system 20 is disclosed. Referring to FIG. 1 the fluid delivery system 20 is fabricated by attaching the first substrate 28 and the second substrate 54 to form the delivery channel 66, wherein the delivery channel 66 provides fluid communication between the micro-channel 34 and the well 44. Preferably, the first substrate 28 is aligned with the second substrate 54 so that the inlet 70 of the delivery channel 66 is adjacent the outlet 48 of the well 44, while the outlet 68 of the delivery channel 66 is adjacent the inlet 38 of the micro-channel 34. In this way, the micro-channel 34 is in fluid connection with the well 44, and thus fluid 22 may travel from the inlet 46 of the well 44 through the well 44, the delivery channel 66, and the micro-channel 34, only to exit at the outlet 36 of the micro-channel 34. Preferably, either alignment marks or existing features on one or both of the first and second substrates 28, 54 are used to align the first substrate 28 with the second substrate 54.

Once the delivery channel 66 is formed, the fluid 22 is delivered to the well 44. The fluid 22 travels down the well 44, through the delivery channel 66, and up the micro-channel 34 to the outlet 36. Fluid 22 can be forced up into the micro-channel 34 by pumping the fluid 22 through the well 44 and the delivery channel 66. Fluid 22 may be pumped through the well 44 and the delivery channel 66 using a variety of techniques, such as by creating a pressure differential between the inlet 46 and the outlet 36, or simply by capillary action. Preferably, the fluid 22 is kept in the micro-channel 34 and prevented from unintentionally exiting the micro-channel 34 by creating a hydrophobic surface 74 adjacent the outlet 36 of the micro-channel 34. Once the micro-channel 34 is filled with fluid 22, the fluid 22 can then be transferred to a probe 78, such as an SPM (Scanning Probe Microscopy) probe, and more specifically to the tip 80 of the probe 78, as illustrated in FIG. 3.

In one embodiment, a micro-pipette 84 forms the micro-channel 34. Preferably, a portion of the micro-pipette 84 extends both above and below the top surface 30 of the first substrate 28, as illustrated in FIG. 2. Preferably, the fluid delivery system 20 includes an array of micro-pipettes 84, as illustrated in FIGS. 2-5, allowing for multiple fluids 22 to be dispensed from the array of micro-channels 34.

Figure 6:
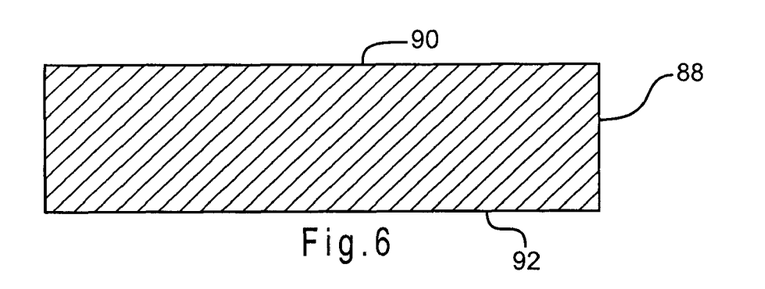
FIGS. 6-11 illustrate, in cross-section, process steps for the fabrication of a micro-pipette structure for use in a fluid delivery system in accordance with one preferred embodiment of the invention.

In one embodiment, a method for fabricating the micro-pipette 84 is disclosed, as illustrated in FIGS. 6-11. Referring to FIG. 6, a substrate 88, such as first substrate 28, is provided. Preferably, the substrate 88 has a top surface 90 which is previously processed and cleaned to remove debris and native oxides. The top surface 90 is opposed to a bottom surface 92.

Preferably, the bottom surface 92 is also previously processed and cleaned to remove debris and native oxides.

Referring to FIG. 7, a channel 94, such as a micro-channel 34, having a wall 95 is formed through the substrate 88 from the top surface 90 to the bottom surface 92. Preferably, the channel 94 is formed by etching all the way through the substrate 88 from the top surface 90 to the bottom surface 92; however, other means for forming the channel 94 may be used, such as drilling. Preferably, the channel 94 is formed using reactive ion etching. In one embodiment, the channel 94 is formed by etching through the top surface 92 to form a first channel 100 and then etching through the bottom surface 92 to form a second channel 102, wherein the first and second channels 100, 102 connect, as illustrated in FIG. 7. The channel 94 has an inlet 98 for receiving fluid, such as fluid 22, and an outlet 96 for delivering fluid to, for example, a probe, such as probe 78. In one embodiment, the outlet 96 has a cross-sectional area that is generally circular in shape. In yet another embodiment, the inlet 98 has a cross-sectional area that is larger than the cross-sectional area of the outlet 96. The cross-sectional areas and shapes of the inlet 98 and the outlet 96 may be freely chosen, using patterning techniques, such as those used to pattern semiconductor substrates.

Figure 8:
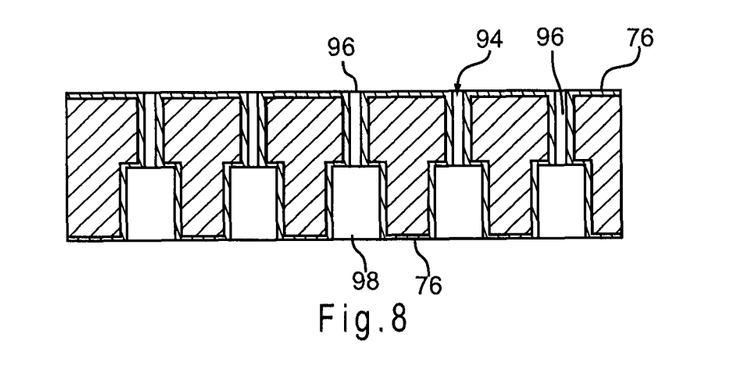

After forming the channel 94, the top surface 90, the bottom surface 92, and the wall 95 of the channel 94 are all coated with a layer 76 of support material, as illustrated in FIG. 8. The support material may include any material that can be formed or coated onto a surface, such as those used in semiconductor processing. Examples include oxides, such as silicon oxide and silicon oxynitride, nitrides such as silicon nitride and titanium nitride, metals such as tungsten and gold, and polymers. The support material may be formed by chemical reaction with the substrate 88, for example by oxidation, or by coating, for example with chemical vapor deposition or oblique angle physical vapor deposition. Preferably, the support material is different from the material contained in the substrate 88. Multiple materials may also be used, and these may be applied with the first support material, or they may be applied after further processing steps. In one embodiment, the layer 76 is silicon dioxide which is formed by reacting the substrate 90, preferably made of silicon, with oxygen.

Figure 9:
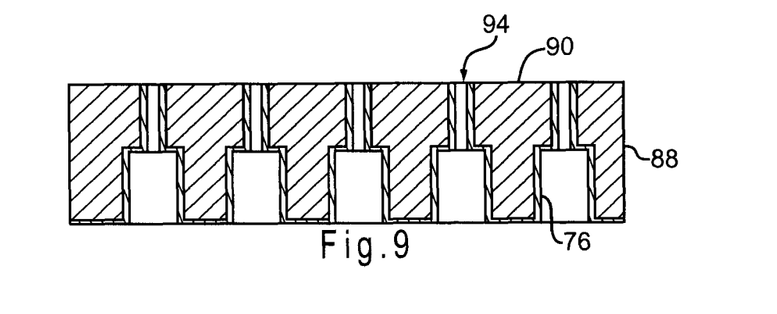

After forming the layer 76, a portion of the layer 76 is removed. Preferably, the layer 76 is removed from the top surface 90 to expose the top surface 90 of the substrate 88. In one embodiment, the layer 76 is removed from the bottom surface 92 to expose the bottom surface 92 of the substrate 88. Layer 76 may be removed in one of a number of ways, such as the use of chemical-mechanical polishing or etching. The channel 94 may be filled with a protectant, such as wax, to avoid damaging the channel 94 with a polishing agent. The protectant may be removed with a solvent, such as acetone.

Figure 10:
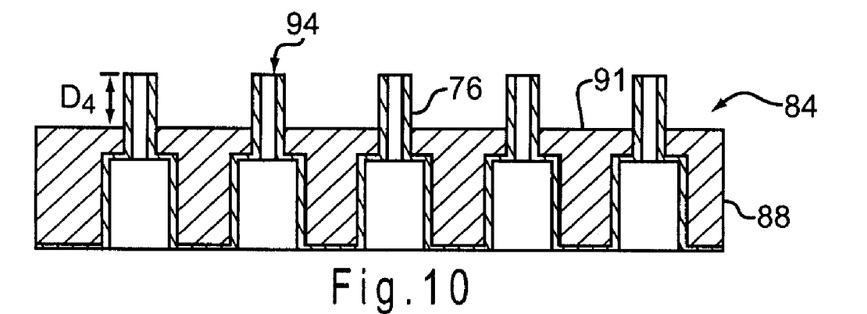

Upon removing the layer 76, the substrate 88 is then etched to remove a portion of either the top surface 90 or the bottom surface 92 of the substrate 88, as illustrated in FIG. 10. Preferably, the substrate 88 is etched to a depth $D_4$, as illustrated in FIG. 10, of between 50 and 500 microns, and more preferably, a depth of at most 150 microns. Various types of etching may be used to remove a portion of the substrate 88, such as wet etching with ethylene diamine pyrocatechol or potassium hydroxide, or dry etching. Preferably, the top surface 90 is etched to remove a portion of the substrate 88 and create an etched surface 91 which is closer to the bottom surface 92 than the original top surface 90.

Figure 11:
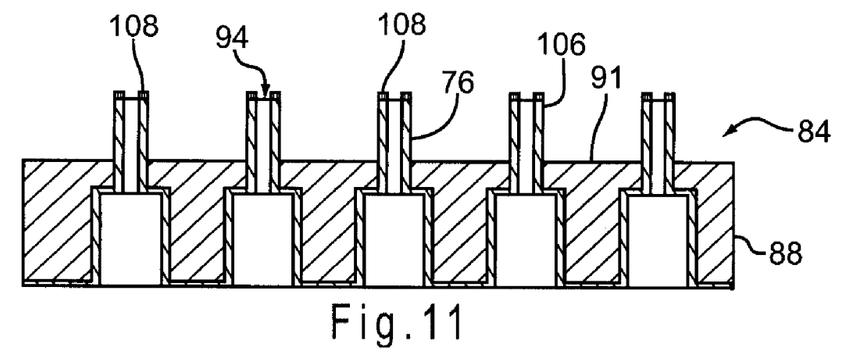

Preferably, upon etching the substrate 88, a hydrophobic material is applied to the surface 106 surrounding the outlet 96 to create a hydrophobic surface 108, as illustrated in FIG. 11.

The individual processing steps used in accordance with the present invention are well known to those of ordinary skill in the art, and are also described in numerous publications and treatises, including: *Encyclopedia of Chemical Technology, Volume* 14 (Kirk-Othmer, 1995, pp. 677-709); *Semiconductor Device Fundamentals* by Robert F. Pierret (Addison-Wesley, 1996); *Silicon Processing for the VLSI Era* by Wolf (Lattice Press, 1986, 1990, 1995, vols 1-3, respectively); and *Microchip Fabrication: A Practical Guide to Semiconductor Processing* by Peter Van Zant (4$^{th}$ Edition, McGraw-Hill, 2000). In order to etch through the substrate, techniques such as deep ion etching may be used (also known as the Bosch process).

The fluid delivery system may be used to form patterns using fluids on surfaces. For example, if the fluid is an ink, then a surface, such as paper, could be printed with the probes after they have received the ink, to form microprinting. Biological arrays may similarly be formed, for example by using fluids containing biological compounds, such as nucleotides (RNA, DNA, or PNA), proteins (enzymes, antibodies, etc.), lipids, carbohydrates, etc. to spot a substrate, such as glass, silicon, or polymers. Since each micro-channel may be supplied for a dedicated well, very complex arrays may be produced quickly.

Numerous additional variations in the presently preferred embodiments illustrated herein will be determined by one of ordinary skill in the art, and remain within the scope of the appended claims and their equivalents. For example, while the examples provided above relate to silicon-based semiconductor substrates, it is contemplated that alternative semiconductor materials can likewise be employed in accordance with the present invention, and that the semiconductor substrates may be undoped, P-doped, or N-doped. Suitable materials for the substrates include but are not limited to silicon, gallium arsenide, germanium, gallium nitride, aluminum phosphide, $Si_{1-x}Ge_x$ and $Al_xGa_{1-x}As$ alloys, wherein x is greater than or equal to zero and less than or equal to one, the like, and combinations thereof. Additional examples of materials for use in accordance with the present invention are set forth in *Semiconductor Device Fundamentals* by Robert F. Pierret (p. 4, Table 1.1, Addison-Wesley, 1996).

Although the invention has been described and illustrated with reference to specific illustrative embodiments thereof, it is not intended that the invention be limited to those illustrative embodiments. Those skilled in the art will recognize that variations and modifications can be made without departing from the spirit of the invention.

The invention claimed is:

1. A method for fabricating a fluid delivery system, comprising:
    attaching a first substrate and a second substrate to form a delivery channel between the first substrate and the second substrate,
    wherein the delivery channel provides fluid communication between a first micro-channel and a first well, and the first micro-channel and the first well are both in the first substrate, and
    a second micro-channel and a second well are in the first substrate, and the distance between the first and second wells is greater than the distance between the first and second micro-channels.

2. The method of claim 1, wherein the delivery channel comprises a groove formed on a surface of the second substrate.

3. The method of claim 1, wherein the delivery channel comprises a groove formed on a surface of the first substrate.

4. The method of claim 1,
    wherein the first well has a well inlet for receiving fluid,
    the first micro-channel has a micro-channel outlet for delivering fluid, and
    a cross-sectional area of the well inlet is greater than a cross-sectional area of the micro-channel outlet.

5. The method of claim 4, wherein the cross sectional area of the well inlet is between one and twenty square millimeters, and the cross sectional area of the micro-channel outlet is between 100 and 10,000 square microns.

6. The method of claim 4, further comprising forming a hydrophobic surface surrounding the micro-channel outlet.

7. The method of claim 1, wherein the first substrate has a thickness of at most 500 microns.

8. The method of claim 1, wherein the first substrate is bonded to the second substrate by spin-on bonding or high temperature bonding.

9. The method of claim 1, further comprising forming the first micro-channel in the first substrate.

10. The method of claim 9, wherein the forming comprises etching the first substrate.

11. The method of claim 9, wherein the first substrate comprises a top surface opposed to a bottom surface;
    the method further comprising coating the top surface, the bottom surface and the first micro-channel with a support material.

12. The method of claim 11, wherein the coating the top surface, the bottom surface and the first micro-channel comprises growing a layer of oxide on the first substrate.

13. The method of claim 11, wherein the support material comprises a dielectric.

14. The method of claim 11, further comprising etching the top surface to remove a portion of the first substrate.

15. The method of claim 14, wherein the etching provides an etched surface opposed to the bottom surface, and
    the micro-channel extends both above and below the etched surface.

16. The method of claim 1, wherein
    the first micro-channel comprises a coating comprising a support material, and
    the first substrate comprises a top surface opposed to a bottom surface;
    the method further comprising etching the top surface to remove a portion of the first substrate.

17. The method of claim 16, wherein the support material comprises a dielectric.

18. The method of claim 16, wherein the etching provides an etched surface opposed to the bottom surface, and
    the micro-channel extends both above and below the etched surface.

19. The method of claim 1, further comprising forming the first well in the first substrate.

20. The method of claim 19, wherein the forming comprises etching the first substrate.

21. The method of claim 1, wherein the first substrate comprises an outer edge and an inside surface;
    the method further comprising forming a plurality of micro-channels at the inside surface, and forming a plurality of wells near the outer edge.

22. The method of claim 1, wherein the second substrate is on a third substrate, a second delivery channel is formed between the second substrate and the third substrate, and the second substrate comprises an extended channel establishing fluid communication between the second micro-channel and the second delivery channel;

the second delivery channel and the extended channel providing fluid communication between the second micro-channel and the second well.

23. The method of claim 22, further comprising forming the extended channel in the second substrate.

24. The method of claim 23, where the forming comprises etching the second substrate.

25. A method for fabricating a fluid delivery system, comprising:

attaching a first substrate and a second substrate to form a delivery channel between the first substrate and the second substrate, and forming the first micro-channel in the first substrate, wherein the delivery channel provides fluid communication between a first micro-channel and a first well, and the first micro-channel and the first well are both in the first substrate, the forming comprises etching the first substrate, and the etching of the first substrate comprises etching a top surface of the first substrate to form a first channel, and etching a bottom surface, opposed to the top surface, to form a second channel;

wherein the first channel is in fluid communication with the second channel.

26. The method of claim 25, wherein a cross-sectional area of the first channel is less than a cross-sectional area of the second channel.

* * * * *